Figure 1:
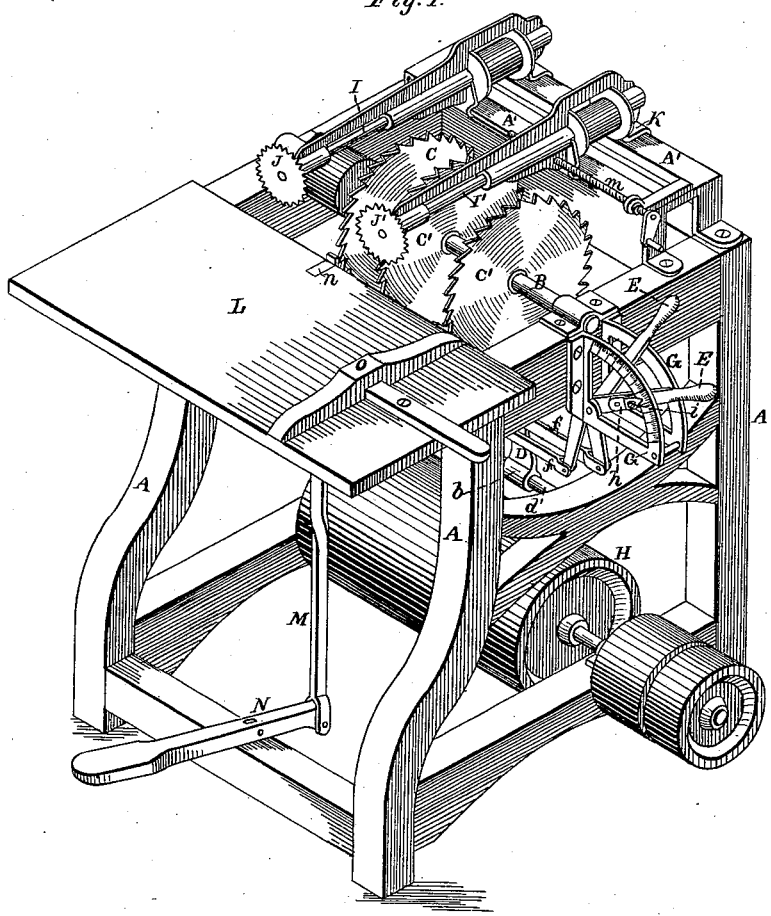

2 Sheets--Sheet 1.

W. G. CALDWELL.
Relishing-Machine.

No. 160,003.  Patented Feb. 23, 1875.

Witnesses:
Henry N. Miller
W. K. Du Hamel

Inventor:
Wm. G. Caldwell.
Per H. T. Abbot,
Attorney

THE GRAPHIC CO. PHOTO-LITH. 39 & 41 PARK PLACE, N.Y.

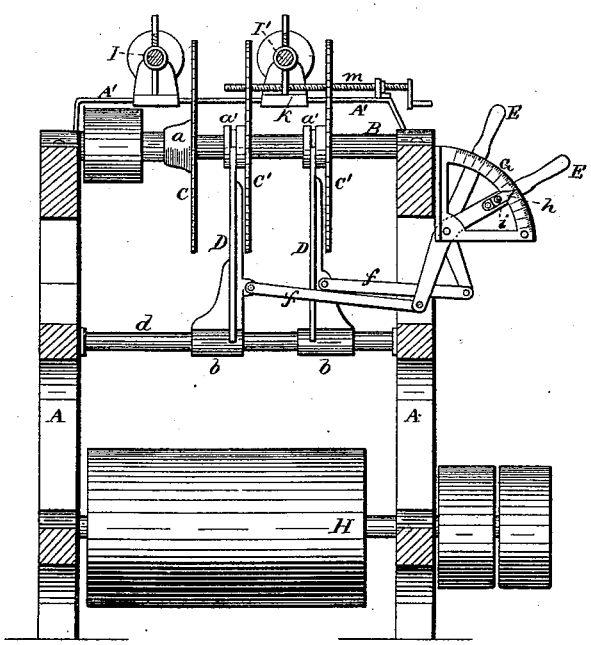
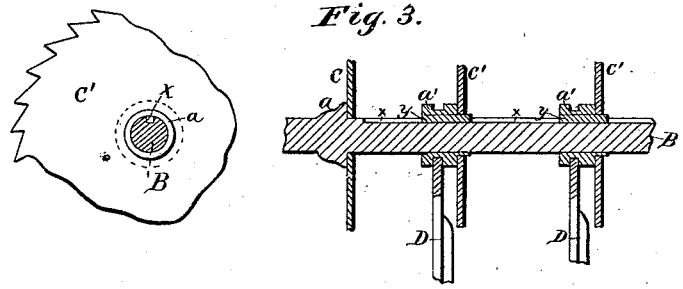

UNITED STATES PATENT OFFICE.

WILLIAM G. CALDWELL, OF THREE RIVERS, MICHIGAN.

IMPROVEMENT IN RELISHING-MACHINES.

Specification forming part of Letters Patent No. 160,003, dated February 23, 1875; application filed May 6, 1874.

*To all whom it may concern:*

Be it known that I, WILLIAM G. CALDWELL, of Three Rivers, county of St. Joseph and State of Michigan, have invented certain new and useful Improvements in Relishing-Machines, of which the following is a specification:

The nature of my invention consists in the construction and arrangement of a relishing-machine having movable saws, as will be hereinafter more fully set forth.

In order to enable others skilled in the art to which my invention appertains to make and use the same, I will now proceed to describe its construction and operation, referring to the annexed drawing, in which—

Figure 1 is a perspective view of my machine. Fig. 2 is a longitudinal section of the same, and Fig. 3 is a longitudinal section of the saw arbor or mandrel.

A represents the frame of my machine, constructed in any suitable manner to contain the working parts thereof. B is the mandrel, upon which are three saws, C and C' C'. The saw C is fastened to a stationary collar, $a$, on the mandrel, and the saws C' C' are each fastened to a loose or sliding collar, $a'$, on the mandrel. The collars $a'$ are fitted to the mandrel by a longitudinal groove, $x$, in the same, and keys $y$ in the collars fitted in said groove, and each collar is moved by means of an arm, D. The upper end of this arm is fitted to the sliding collar $a'$, and the other end forms a sleeve, $b$, fitted on a rod, $d$, below and parallel with the mandrel B. Each arm D is, by a rod or bar, $f$, connected with an elbow or bent lever, E, pivoted at its angle to a segment or arc, G, attached to the side of the main frame A. By means of these levers the saws C' C' may be moved to any desired position on the mandrel. To each lever E is attached an index, $h$, for the purpose of indicating the position of the saws on the mandrel by means of graduating-scales on the arcs G. $i$ is a set-screw passing through the hand and lever to regulate the friction, so as to keep the saws in the desired position on the mandrel. The machine is provided with a counter-shaft, H, for driving the mandrel B, and which also, by a quarter-twist belt, drives two mandrels, I I', with crosscut-saws J J'. The mandrel I is stationary on a raised frame or bed, A', upon the main frame A, and the other is movable upon said bed by means of a screw-shaft, $m$, operating a sliding carriage, K, in which said mandrel has its bearings. By this means the crosscut-saw J' is placed at any desired point in the space between the two movable saws C' on the mandrel B. The saw J' is to be exchanged for a larger or smaller saw, to suit different-sized relishes. L represents the feed-table attached to an upright slide, M, operated by means of a treadle, N. On this table is an adjustable gage, O, and an adjustable stop, $n$.

After the saws have been set to cut the tenons the desired size the gage O and stop $n$ are set to their proper places. The tenoned rail is then laid on the table with the worked edge against the gage, and moved to the saws till the shoulder of the tenon comes against the stop $n$. It is held in this position, and by means of the treadle N the table L is raised, so that the crosscut-saws J J will cut out the relishes.

I am aware that in the construction of edging and relishing machines saws have been made to slide freely upon an arbor, for the purposes of adjustment; and I do not desire, broadly, to claim such, but to confine myself to the combinations set forth in the claims.

Having thus fully described my invention, what I claim as new, and desire to secure by Letters Patent, is—

In a relishing-machine, the combination of the mandrel B, saw C', sliding collar $a'$, arm D, with sleeve $b$, rod $d$, connecting-rod $f$, lever E, and measuring device G $h$ $i$, substantially as shown and described, for the purpose specified.

In testimony that I claim the foregoing as my invention I hereunto affix my signature.

WM. G. CALDWELL.

Witnesses:
D. D. TENNYSON,
L. T. WILCOX.